United States Patent [19]
Kelley

[11] Patent Number: 5,241,879
[45] Date of Patent: Sep. 7, 1993

[54] SNAP-ON FASTENING DEVICE

[75] Inventor: Dixon L. Kelley, New Baltimore, Mich.

[73] Assignee: Teleflex Incorporated, Limerick, Pa.

[21] Appl. No.: 553,898

[22] Filed: Jul. 13, 1990

[51] Int. Cl.⁵ .............................................. F16C 1/10
[52] U.S. Cl. .................... 74/502.4; 74/502.6; 403/70
[58] Field of Search .......... 74/501.5 R, 502.6; 403/70

[56] References Cited

U.S. PATENT DOCUMENTS

| | | | |
|---|---|---|---|
| 4,499,785 | 2/1985 | Bennett et al. | 74/502.4 |
| 4,581,953 | 4/1986 | Walston et al. | 74/502 X |
| 4,625,579 | 12/1986 | Spease | 74/501 |
| 4,694,705 | 9/1987 | Frankhouse et al. | 74/501.5 R |
| 4,887,930 | 12/1989 | Chaczyk et al. | 74/502.4 |
| 4,947,704 | 8/1990 | Gokee | 74/502.4 |

Primary Examiner—Vinh T. Luong
Attorney, Agent, or Firm—Reising, Ethington, Barnard, Perry & Milton

[57] ABSTRACT

A motion transmitting remote control assembly (10) of the type for transmitting motion in a curved path includes a terminal member (36) for interconnecting an extending length of a core element and a control member (24). The terminal member (36) has a hole (38) passing therethrough in which a bushing (44) is disposed. The bushing (44) includes a passageway (48) extending completely through the bushing (44) between an insertion end (50) and a distal end (46) for connecting the terminal member (36) with a control pin (28) of the control member (24). The bushing (44) includes at least one slot (56a) oriented along the core element which enables the bushing (44) to flex transversely to the direction of the core element to release the control pin (28) from the bushing (44) in response to a force (F) applied therebetween when the control pin (28) is inserted into the passageway (48) from the distal end (46) of the bushing (44) instead of through the insertion end (50).

21 Claims, 5 Drawing Sheets

SNAP-ON FASTENING DEVICE

BACKGROUND OF THE INVENTION

1. Field of the Invention

The instant invention relates to a motion transmitting remote control assembly of the type for transmitting motion in a curved path.

2. Description of the Prior Art

Motion transmitting remote control assemblies of the type for transmitting motion in a curved path have many uses in automotive applications. For example, such motion transmitting remote control assemblies are used as throttle controls for controlling the acceleration of a vehicle. A typical throttle control assembly comprises a flexible motion transmitting core element moveably guided by a conduit. A terminal member is secured to one end of the core element for connecting the assembly to a control member, such as a throttle lever.

In a throttle control application, it is extremely important that the terminal member be positively connected to the throttle lever to prevent accidental disconnection. This is especially important in the situation where one automobile is passing another against oncoming traffic. Accidental disconnection would cause the passing automobile to suddenly lose its acceleration, resulting in a possible head-on collision with the oncoming traffic.

U.S. Pat. No. 4,625,579 to Spease, issued Dec. 2, 1986 discloses a motion transmitting remote control assembly including a terminal member having an opening therethrough with a plurality of flexible fingers defining a portion of the opening and for retaining the head of a control member within the opening. Since the opening through the terminal member extends completely through the terminal member, a problem arose wherein the user of the terminal member might insert the head of the control member through the wrong end of the opening, thereby providing a less than effective connection between the terminal member and the control member. In view of this problem, a cap member was provided for disposal into the wrong end of the opening to prevent the upside down installation of the control member into the opening in the terminal member. Although the cap has proven to be an effective way of preventing the insertion of the control member through the wrong end of the opening, the two-piece construction of the terminal member with cap is costly to produce.

Thus, there is a need for a motion transmitting remote control assembly including a simply constructed, low cost terminal member for connection to a control member, such as throttle control, which assures unsafe operation of a vehicle if the terminal member is improperly connected to the control member.

SUMMARY OF THE INVENTION AND ADVANTAGES

In accordance of the present invention, there is provided a motion transmitting remote control assembly of type for transmitting motion in a curved path including core means for transmitting forces along a curved path and conduit means for moveably supporting the core means. Terminal means are provided for connecting the core means to a control member to transmit forces therebetween. The invention is characterized by the terminal means including safety disconnection means for automatically disconnecting the terminal means from the control member in response to the force applied therebetween when the terminal means is improperly connected to the control member.

The instant invention assures that a vehicle having an improperly connected terminal can not be operated by automatically disconnecting the terminal from the control member upon an initial applied force.

The instant invention further assures that the terminal means is not damaged upon automatic disconnection so it can be reconnected to the control member in a safe and proper manner.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

A motion transmitting remote control assembly of the type for transmitting motion in a curved path is generally shown at 10 in the Figures.

The assembly 10 includes conduit means 12 comprising a conduit (not shown) having an end portion connected to a rigid tube member 14. The conduit is preferably the type including an inner tubular member made of an organic polymeric material surrounded by a plurality of long lay wires disposed helically thereabout with a casing of organic polymeric material disposed about the long lay wires and the inner tubular member. The tube member 14 may be connected to the conduit at a swivel joint thereby allowing swivelling movement of a tube member 14 relative to the conduit. A wiper member 16 is mounted on the end portion of the tube member 14. The assembly 10 further includes core means 18 moveably supported by the conduit means 12 for transmitting forces along a curved path.

More specifically, the core means 18 includes a flexible core element (not shown) disposed within the conduit for reciprocating movement therein. The core means 18 includes a rod member 20 connected to one end of the flexible core element and extending from the tube member 14 to provide a variably extending length of the core means 18 between the conduit means 12 and back end of the rod member 20 extending from the tube member 14.

The assembly 10 includes terminal means 22 for operatively connecting the core means 18 to a control member 24 to transmit forces therebetween. The control member 24 may include a pivotally supported lever 26, such as a throttle lever 26. The control member 24 may further include a control pin 28 extending from the throttle lever 26 for connection with the terminal means 22. The control pin 28 has an annular groove 30 extending circumferentially thereabout to define a cylindrical body portion 32 and a cylindrical head portion 34 extending from the body portion 32.

The terminal means 22 includes a terminal member 36 extending from the extended end of the rod member 20. As shown in the Figures, the terminal member 36 is formed integrally with the rod member 20. However, it will be appreciated that the terminal member 36 could be formed separately from the rod member 20, such as molding the terminal member 36 about the extended end of the rod member 20, as is well known in the art.

The terminal member 36 comprises a paddle or bladelike member having a hole 38 defining an opening extending completely through the terminal member 36 between opposite first 40 and second 42 sides thereof.

The terminal means 22 further includes safety disconnection means, such as a bushing 44, for automatically disconnecting the terminal means 22 from control member 24 in response to a force applied therebetween when the terminal means 22 is improperly connected to the control member 24.

The bushing 44 comprises a thin-walled, generally cylindrically-shaped member which is injection molded of an organic polymeric material. A material which has proven to be successful is a molybdenum disulfide (MSO2) filled type 66 Nylon sold under the trademark NYLATRON (type no. 1028) owned by the Polymer Corporation, Reading, Pa.

The bushing 44 is disposed in the hole 38 of the terminal member 36 and extends laterally from the first side 40 of the terminal member 36 to a distal end 46. The bushing 44 includes a passageway 48 extending completely through the bushing 44 between the distal end 46 and an opposite insertion end 50. The passageway 48 is dimensioned for receiving the control pin 28 into the insertion end 50 of the bushing 44.

The bushing 44 further includes retaining means 52 disposed in the passageway 48 near the distal end 46 thereof for engaging and retaining the control pin 28 therein. More specifically, the retaining means 52 comprises an annular rib 54 extending about and projecting into the passageway 48. The annular rib 54 retains the control pin 28 in the passageway 48 by engaging the annular groove 30 of the control pin 28, thereby preventing relative longitudinal movement between the control pin 28 and the bushing 44, while simultaneously allowing for relative rotational movement therebetween.

Figure 14:
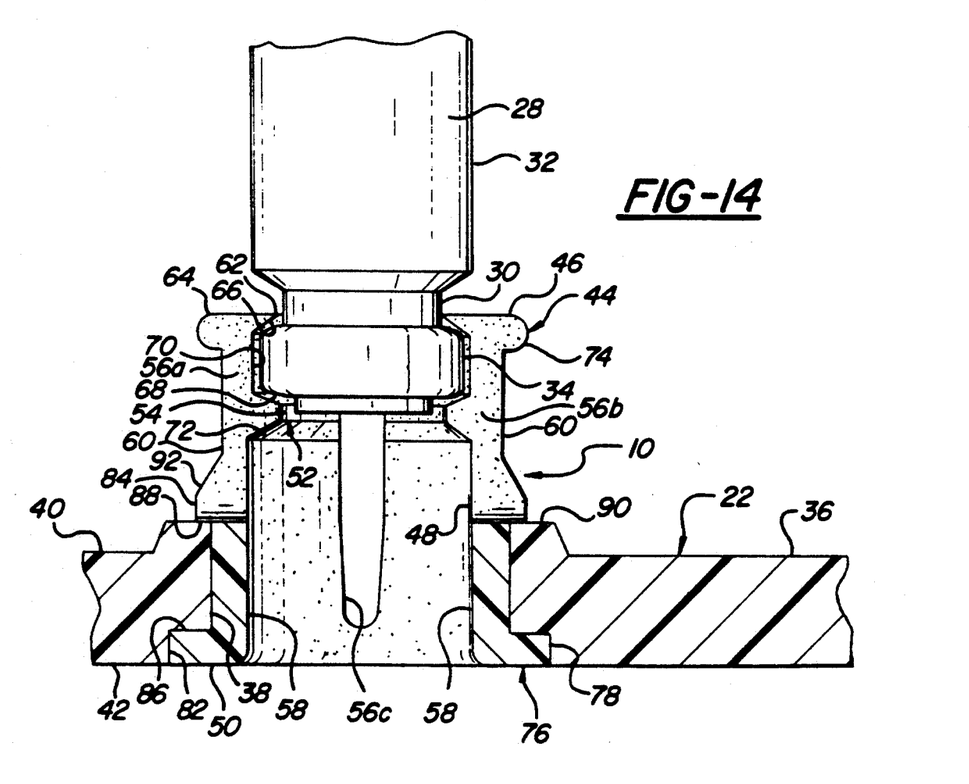
FIG. 14 is a fragmentary cross-sectional view of the instant invention shown improperly connected to the control pin with the head of the control pin captured between the rib and lip of the bushing.
Figure 15:
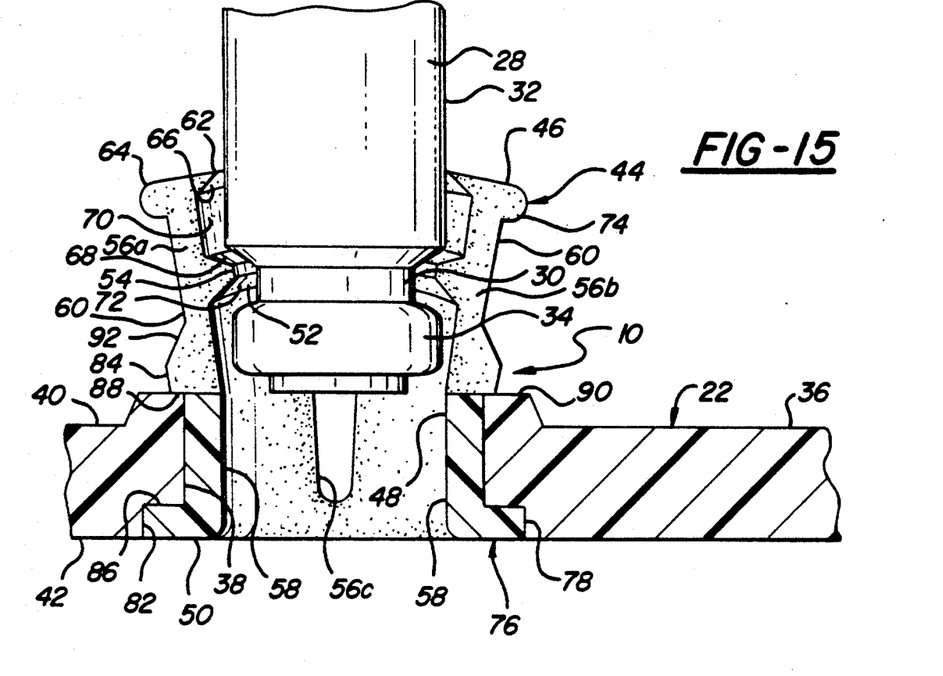
FIG. 15 is a fragmentary cross-sectional view like FIG. 14 but with the control pin inserted further into the bushing.
Figure 16:
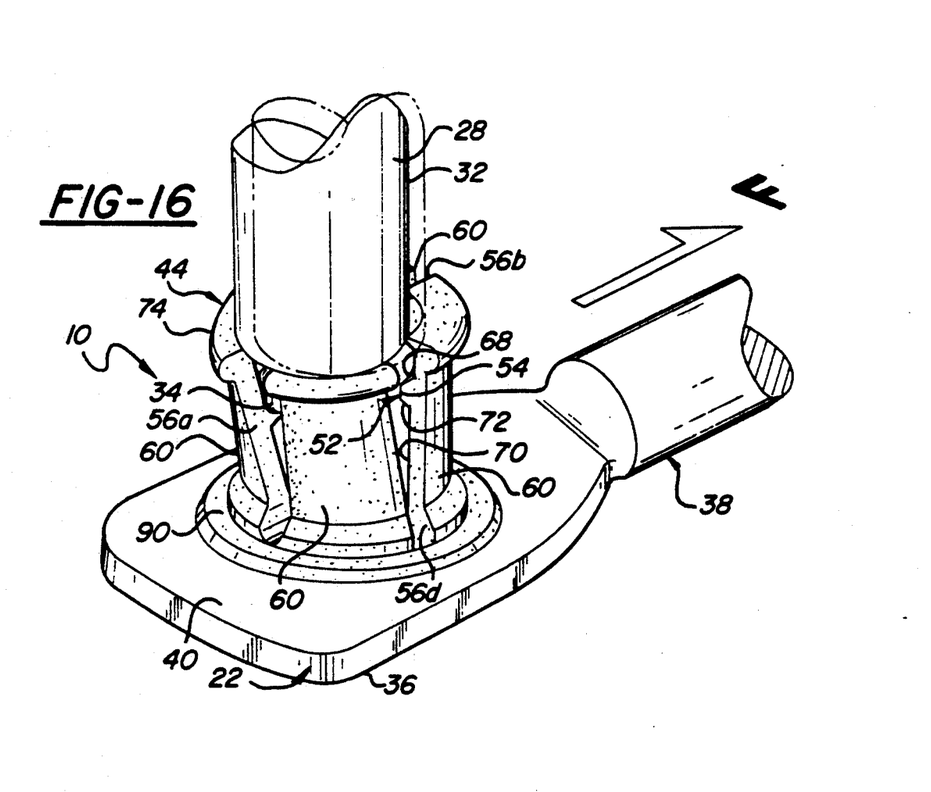
FIG. 16 is a perspective view of the subject invention showing the terminal being automatically disconnected from the control pin in response to a force applied therebetween.

The bushing 44 includes release means, such as a slot 56a extending axially into the bushing 44 from the distal end 46 thereof, for releasing the control pin 28 from the bushing 44 when the control pin 28 is inserted into the passageway 48 from the distal end 46 of the bushing 44 instead of the insertion end 50, as illustrated in FIGS. 14–16. Thus, when a force is applied between the bushing 44 and the control pin 28, such as an actuation force F transmitted by the core means 18, the slot 56a allows the bushing 44 to flex transversely to the direction of the core means 18 to enable the control pin 28 to be released from the bushing 44, as best illustrated in FIG. 16.

Figure 3:
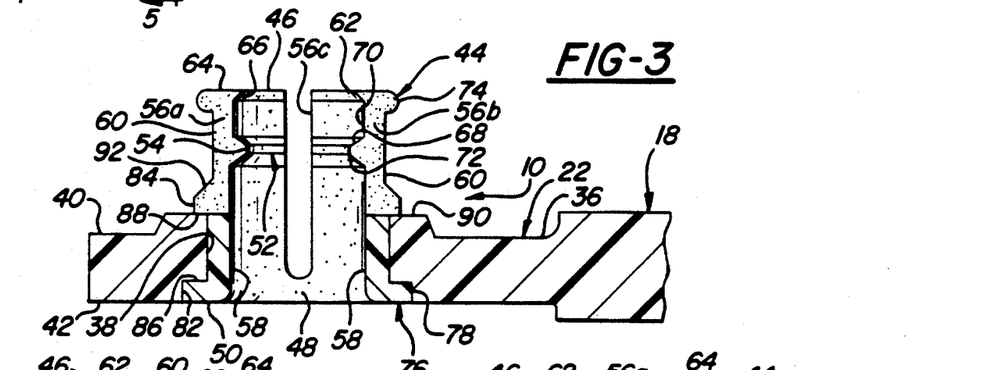
FIG. 3 is a cross-sectional view taken along lines 3—3 of FIG. 2.
Figure 4:
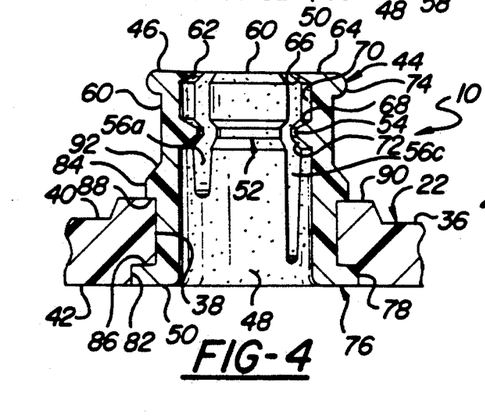
FIG. 4 is a cross-sectional view taken along lines 4—4 of FIG. 2.
Figure 5:
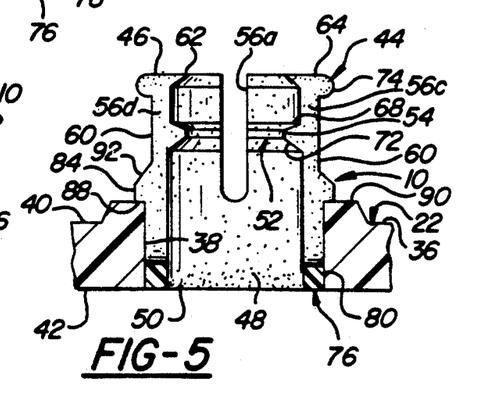
FIG. 5 is a cross-sectional view taken along lines 5—5 of FIG. 2.
Figure 6:
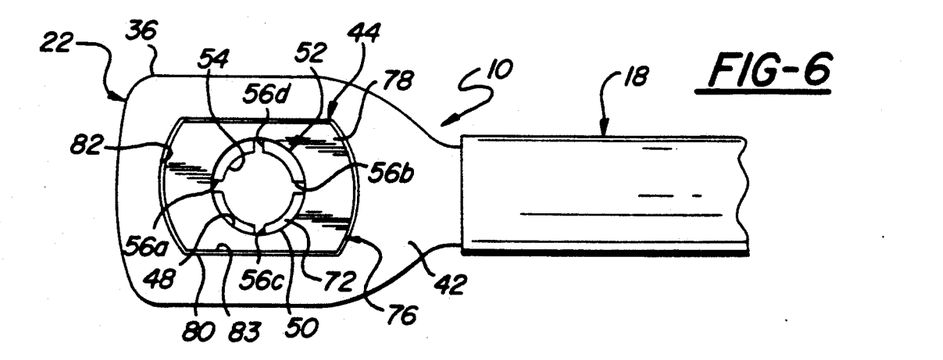
FIG. 6 is an enlarged fragmentary rear view of the instant invention.
Figure 7:
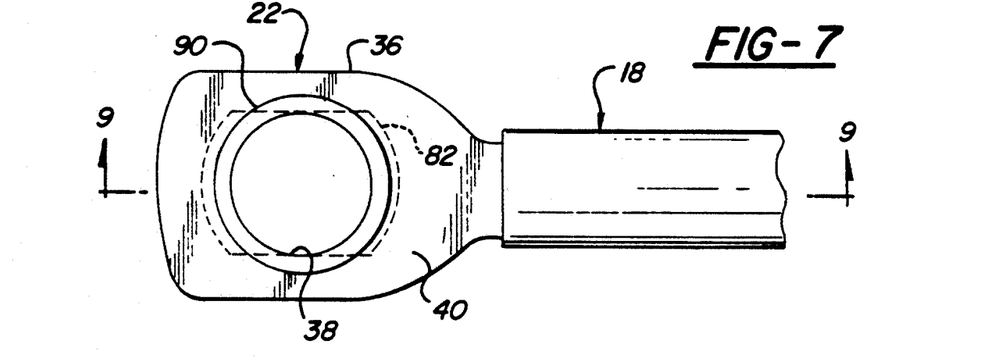
FIG. 7 is an enlarged fragmentary front view of a terminal member of FIG. 2.
Figure 8:
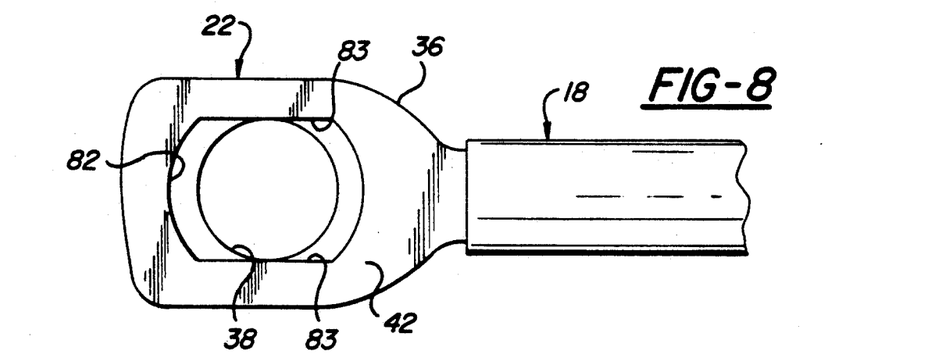
FIG. 8 is an enlarged fragmentary rear view of the terminal member of FIG. 7.
Figure 9:
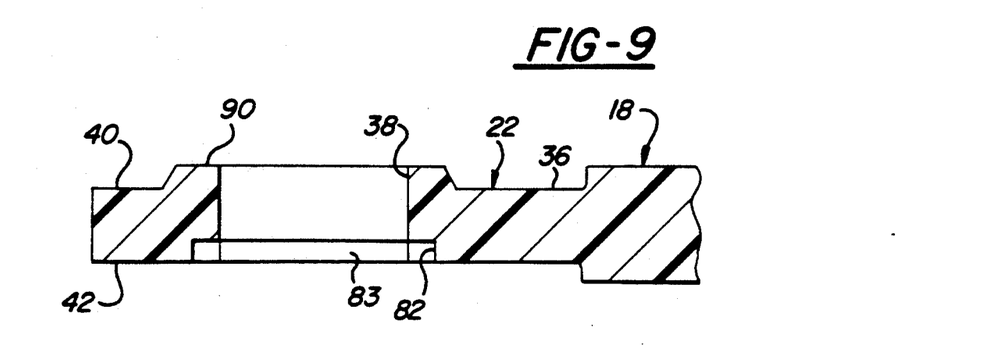
FIG. 9 is a cross-sectional view taken substantially along lines 9—9 of FIG. 7.
Figures 10, 11, 12:
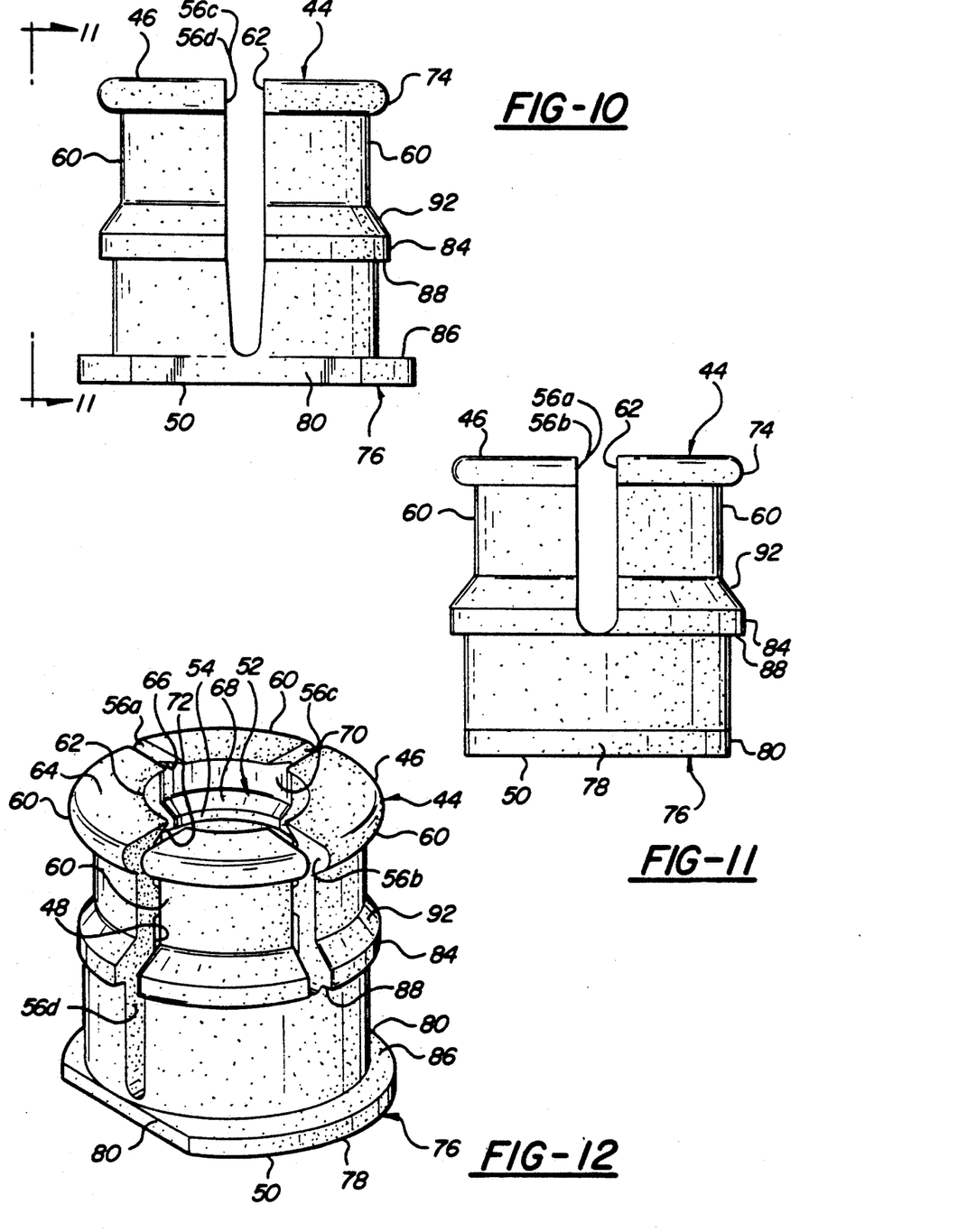
FIG. 10 is an enlarged side view of a bushing constructed in accordance with the instant invention.
FIG. 11 is a side view taken substantially along lines 11—11 of FIG. 10.
FIG. 12 is an enlarged perspective view of the bushing shown in FIG. 10.

As shown in FIG. 3, the slot 56a extends axially into the bushing 44 from the distal end 46 and terminates where the bushing 44 meets the first side 40 of the terminal member 36. The slot 56a is orientated about the central axis of the bushing 44 in line with the core means 18. Thus, the slot 56a is also in line with the actuation force F applied by the core means 18.

Figure 1:
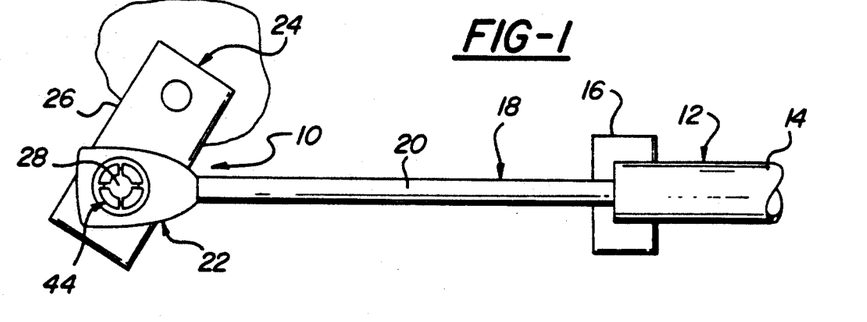
FIG. 1 is a fragmentary front view of a motion transmitting remote control assembly constructed in accordance with the instant invention.
Figure 2:
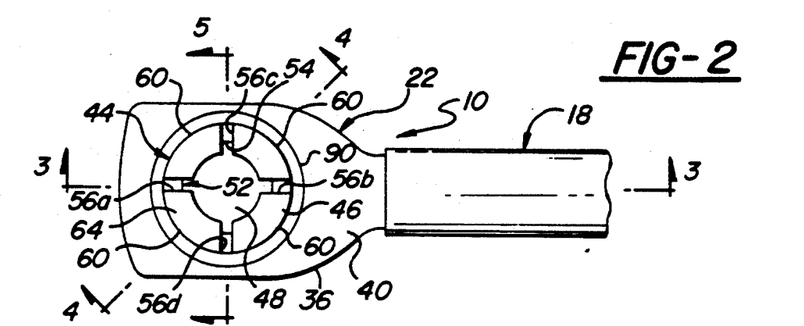
FIG. 2 is an enlarged fragmentary front view of the instant invention.
Figure 13:
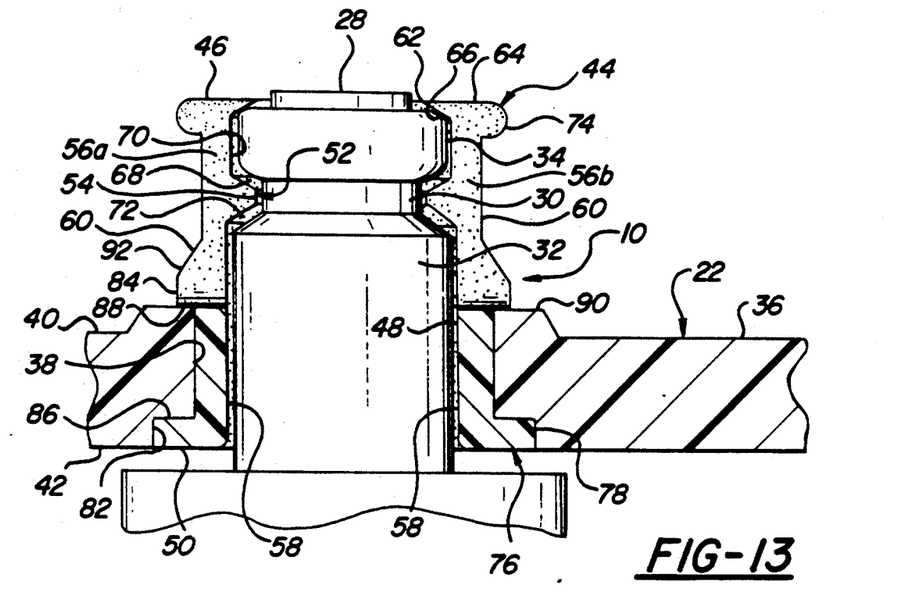
FIG. 13 is a fragmentary cross-sectional view of the subject invention shown properly connected to a control pin.

The bushing 44 includes another identical slot 56b disposed 180° from slot 56a and defining a first pair of slots 56a, 56b, as shown best in FIG. 2. Both of the slots 56a, 56b extend from the distal end 46 of the bushing 44 and terminate where the bushing 44 meets the first side 40 terminal member 36, so that no portion of the slots 56a, 56b extend into the hole 38 of the terminal member 36. Thus, when the control pin 28 is properly received into the bushing 44 through the terminal member 36, as illustrated in FIG. 13, the bushing 44 presents a full bearing surface 58 between the control pin 24 and the terminal member 36 along the line of the core means 18. In this manner, when the application force F is applied by the core means 18. The bushing 44 will not spread apart or yield in response to the force F so that a maximum acceleration condition can be achieved.

The bushing 44 includes a second pair of slots 56c, 56d disposed 180° apart from one another and 90° from the first pair of slots 56a, 56b. The second pair of slots 56c, 56d extend axially into the bushing 44 from the distal end 46 thereof to a position within the terminal member 36 so as to be longer than the first pair of slots 56a, 56b. However, since the second pair of slots 56c, 56d are not in line with the core means 18, they present no problem with respect to the spreading of bushing 44 as they would if they were oriented in line with the core means 18 as described above. The slots 56a, 56b, 56c, 56d thus define four flexible fingers 60 extending perpendicularly outwardly of the first side 40 of the terminal member 36.

The bushing 44 includes a lip 62 disposed in the passageway 48 at the distal end 46 of the bushing 44. The lip 62 includes a flat outwardly facing surface 64 defining a portion of the distal end 46 which acts as a barrier for inhibiting the insertion of the control pin 28 into the distal end 46 of the bushing 44. The lip 62 also includes an inwardly facing circumferential surface 66 which cooperates with the first shoulder portion 68 of the rib 54 to form a pocket 70 therebetween for receiving the head 34 of the control pin 28. The annular rib 54 also includes a second shoulder portion 72 disposed oppositely of the first shoulder portion 68. The first 68 and second 72 shoulder portions are inclined toward one another in differing degrees for making insertion of the control pin 28 into the bushing 44 easier than removal of the control pin 28. More particularly, the first shoulder portion 68 faces generally toward the distal end 46 of the bushing 44 and is inclined 20° toward the terminal member 36. The second shoulder portion 72 faces generally toward the terminal member 36 and is inclined 30° toward the distal end 46 of the bushing 44. In this manner, the 30° inclination of the second shoulder portion 72 provides a lower insertion force of the control pin 28 into the bushing 44 relative to the force necessary to remove the control pin 28. The inwardly facing surface 66 of a lip 62 is also inclined 30° toward the distal end 46 for accommodating the head 34 of the control pin 28.

The bushing 44 includes an outer annular ring 74 which is disposed about the distal end 46 of the bushing 44. A ring 74 acts as a riser during the injection molding of the bushing 44 to provide adequate material to the lip 62 to ensure its complete formation.

The assembly 10 further includes slot alignment means coacting between the bushing 44 and the terminal member 36 for aligning the first pair of slots 56a, 56b in the line of direction of the core means 18. The slot alignment means comprises an irregularly shaped shoulder 76 disposed in the terminal member 36 and a complementary flange 78 extending from the bushing 44 and disposed in the shoulder 76 for preventing rotation of the bushing 44 in the terminal member 36. The flange 78 appears as a circular formation protecting perpendicularly outwardly of the bushing 44 from the insertion end 50 thereof with segments of the circle removed to present flats 80. The flats 80 are oriented parallel to the first set of slots 56a, 56b and are tangent to bushing 44 at the second set of slots 56c, 56d. The distance between the flats 80 is substantially equal to the diameter of the hole 38 in the terminal member 36.

The irregularly shaped shoulder 76 is formed as a recess 82 in the second side 42 of the terminal member 36. The recess 82 has a shape complementing the shape of the flange 78 defining a pair of complimentary flats 83 and has a depth equal to the thickness of the flange 78 so that when the bushing 44 is disposed in the terminal member 36, the insertion end 50 of the bushing 44 is flush with the second side 42 of the terminal member 36. The flats 80 of the flange 78 thus coact with the flats 83 of the recess 82 to prevent relative rotation between the bushing 44 and the terminal member 36. The recess 82 is oriented with the flats 83 aligned along the direction of the core means 18 so that when the bushing 44 is disposed in the terminal member 36, the first set of slots 56a, 56b are property aligned along the direction of the core means 18. The flange 78 and recess 82 are symmetrical to ensure that the first pair of the slots 56a, 56b will always be properly oriented in line with the core means 18.

The bushing 44 further includes bushing retainer means coacting between the bushing 44 and the terminal member 36 for retaining the bushing 44 in the terminal member 36. The bushing retainer means comprises an outer annular ridge 84 disposed about halfway between the distal end 46 and the insertion end 50 of the bushing 44.

The inner annular rib 54 of the bushing 44 is spaced axially from the ridge 84 about halfway between the ridge 84 and the distal end 46 of the bushing 44.

The flange 78 and ridge 84 present oppositely disposed retaining shoulders 86, 88 spaced a predetermined distance apart to engage the second 42 and first 40 sides of the terminal member 36, respectively, to retain the bushing 44 in the terminal member 36. The first side 40 of the terminal member 36 includes a raised portion 90 disposed circumferentially about the hole 38 of the terminal member 36. The raised portion 90 provides a surface for supporting the retaining shoulder 88 of the ridge 84. The raised portion 90 has a thickness equal to the depth of the recess 82. The strength of the terminal member 36 is thus not reduced by the formation of the recess 82 since the material lost through the formation of recess 82 is added by the raised portion 90.

The ridge 84 also includes an insertion shoulder 92 facing generally toward the distal end 46 of the bushing 44 and inclined 45° toward the terminal member 36 for guiding the insertion of the bushing 44 into the hole 38 of the terminal member 36.

In operation, the distal end 46 of the bushing 44 is inserted into the hole 38 of the terminal member 36 through the second side 42 thereof. The insertion shoulder 92 of the ridge 84 engages the side of the hole and deflects the flexible fingers 60 inwardly toward one another. The flange 78 is aligned with the recess 82 so that upon further insertion of the bushing 44 the flange 78 is received in the recess 82 enabling the ridge 84 will pass out of the hole 38. As one way of assuring that the bushing 44 is properly connected to the terminal member 36 and the first set of slots 56a, 56b are properly aligned along the core means 18, the flange 78 functions to prevent insertion of the control pin 28 into the bushing 44 until the flange 78 is fully received into the recess 82 of the terminal member 36. That is, until the flange 78 is properly aligned and fully received within the recesses 82 of the terminal member 36, the outer ridge 84 of the bushing 44 remains within the hole 38 of the terminal member 36, causing the flexible fingers 60 to remain in the inwardly deflected condition. In this condition, the control pin 28 can not be fully inserted and engaged with the annular rib 54 of the bushing 44. Additionally, an attempt to insert the control pin 28 into the distal end 46 of the bushing 44, would cause the bushing 44 to be ejected from the hole 38 of the terminal member 36, further assuring a safe, proper connection of the terminal member 36 in the control pin 38.

As the ridge 84 passes out a hole 38, the flexible fingers 60 deflect outwardly from one another and the corresponding retaining shoulders 86, 88 of the flange 78 and ridge 84, respectively, engage opposite sides of the terminal member 36 to retain the bushing 44 within the terminal member 36.

With the bushing 44 securely received into the terminal member 36, the terminal member 36 can be connected to the control pin 28. The head 44 of the control pin 28 is inserted into the insertion end 50 of the bushing 44 until the head 34 of the control pin 28 contacts the second shoulder portion 72 of the annular rib 54. As the control pin 28 is forced past the annular rib 54, the ramping surfaces of the control pin 28 and the second shoulder portion 72 urge the flexible fingers 60 outwardly of the control pin 28, until the head 34 of the control pin 28 is moved past the rib 54. As the head 34 of the control pin 28 is moved past the annular rib 54, the flexible fingers 60 deflect back toward the control pin 26 as the annular rib 54 engages the annular groove 30 of the control pin. In this manner, the head 34 of the control pin 28 is captured in the pocket 70 between the rib 54 and the lip 62 of the bushing 44, as best illustrated in FIG. 13. The body portion 32 of the control pin 28 is thus extended completely through the terminal member 36 and is in full bearing contact with the bushing 44 along the line of the core means 18.

A situation may arise where the user of the terminal member 36 improperly connects the terminal member 36 to the control pin 28 as shown in FIGS. 14–16. In FIG. 14, the head 34 of the control pin 28 has been maneuvered into the distal end 46 of the bushing 44 so that the head 34 of the control pin 28 is captured in the pocket 70.

In FIG. 15, the control pin 28 has been inserted further into the distal end 46 of the bushing 44 so that the head 34 of the control pin 28 is inserted beyond the rib 54 of the bushing 44. As the head 34 of the control pin 28 is inserted past the rib 54, the lip 62 of the bushing 44 engages the body portion 32 of the control pin 28, causing the flexible fingers 60 to deflect outwardly of the control pin 28.

Upon application of an actuation force F, such as the initial application force F applied to the accelerator control system of an automobile after it has been fully assembled in an automotive assembly plant, the slot 56a coacts with the control pin 28 to deflect adjacent flexible fingers 60 outwardly of the control pin 28 transversely to the force F applied along the core means 18 as seen in FIG. 16. As the flexible fingers 60 deflect, the slot 56a widens to enable the control pin 28 to escape from the bushing 44 without damaging either the control pin 28 or the bushing 44.

Once the improperly connected terminal member 36 is disconnected from the control pin 28, the user of the terminal member 36 may safely reconnect the undamaged terminal member 36 and bushing 44 to the control pin 28 in the proper manner as shown in FIG. 13.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly comprising:
   core means (18) for transmitting forces along a curved path;
   conduit means (12) for moveably supporting said core means (18);
   terminal means (22) connected to said core means (18) and including a terminal member (36) having a hole (38) extending therethrough and a bushing (44) separate and distinct from said terminal member (36) and disposed in said hole (38) and including a passageway (48) extending between an insertion end (50) and an opposite distal end (46) of said busing (44) for normally and properly receiving a control pin (28) of a control member (24) into said passageway (48) through said insertion end (50), said terminal means (22) being improperly connected to the control pin (28) when the control pin (28) is inserted into said passageway (48) from said distal end (46) rather than said insertion end (50); and
   characterized by safety disconnection means comprising at least one slot (56a) formed on said distal end (46) of said bushing (44) in communication with said passageway (48) and aligned with said core means (28) for coacting with the control pin (28) upon application of an actuation force (F) to said core means (18) to flex said distal end (46) of said bushing transversely of said core means (18) and thereby disconnect said terminal means (22) from the control pin (28) without damaging said terminal means (22) when said terminal means (22) is improperly connected to the control pin (28).

2. An assembly as set forth in claim 1 further characterized by said bushing (44) extending outwardly beyond said first side (40) of said terminal member (36).

3. An assembly as set forth in claim 2 further characterized by said one slot (56a) extending axially into said bushing (44) from said distal end (46) toward said insertion end (50) and terminating in said bushing (44) at a location between said distal end (46) of said bushing (44) and said first side (40) of said terminal member (36) thereby presenting a full bearing surface (58) to the control pin (28) between the first (40) and second (42) sides of said terminal member (36) in line with said core means (18).

4. An assembly as set forth in claim 3 further characterized by including another slot (56b) identical to said one slot (56a) and disposed 180 degrees from said one slot (56a) in said bushing (44), said one slot (56a) and said another slot (56b) defining a first pair of slots (56a, 56b).

5. An assembly as set forth in claim 4 further characterized by including a second pair of slogs (56c, 56d) disposed 180 degrees apart from each other and 90 degrees from said first pair of slots (56a, 56b).

6. An assembly as set forth in claim 5 further characterized by said second pair of slots (56c, 56d) extending axially into said bushing (44) from said distal end (46) toward said insertion end (50) thereof and terminating in said bushing (44) at a position between said first (40) and said second (42) sides of said terminal member (36) so as to be longer than said first pair of slots (56a, 56b).

7. An assembly as set forth in claim 6 further characterized by including slot alignment means coacting between said bushing (44) and said terminal means (22) for aligning said first pair of said slots (56a, 56b) in the line of direction of said core means (18).

8. An assembly as set forth in claim 7 further characterized by said slot alignment means comprising an irregularly shaped shoulder (76) formed in said second side (42) of said terminal member (36) and a complimentary flange (78) extending from said bushing (44) and disposed in said shoulder (76) for preventing rotation of said bushing (44) in said terminal member (36).

9. An assembly as set forth in claim 8 further characterized by said bushing (44) including retaining means (52) disposed in said passageway (48) near said distal end (46) of said bushing (44) for engaging and retaining the control pin (28) in said passageway (48).

10. An assembly as set forth in claim 9 further characterized by said retaining means (52) comprising an annular rib (54) extending around said passageway (48) adjacent said distal end (46) of said bushing (44).

11. An assembly as set forth in claim 10 further characterized by including a lip (62) disposed in said passageway (48) at said distal end (46) of said bushing (44).

12. An assembly as set forth in claim 11 further characterized by said rib (54) and said lip (62) forming a pocket (70) therebetween for receiving a head (34) on the end of the control pin (28).

13. An assembly as set forth in claim 12 further characterized by said rib (54) including a first shoulder portion (68) facing generally toward said distal end (46) and including 20 degrees toward said terminal member (36) and an oppositely including second shoulder portion (72) facing generally toward said terminal member (36) and inclined 30 degrees toward said distal end (46).

14. An assembly as set forth in claim 13 further characterized by said lip (62) having an inwardly facing circumferential surface (66) inclined 30 degrees toward said distal end (46) and a flat outwardly facing surface (64).

15. An assembly as set forth in claim 14 further characterized by including bushing retainer means coacting between said bushing (44) and said terminal member (36) for retaining said bushing (44) in said hole (30) of said terminal member (36).

16. An assembly as set forth in claim 15 further characterized by said bushing retainer means comprising an outer annular ridge (84) disposed about said bushing (44) and spaced a predetermined axial distance from said flange (78), said ridge (84) abutting said first side (40) of said terminal member (36) and said flange (78) abutting said second side (42) of said terminal member (36).

17. An assembly as set forth in claim 16 further characterized by said irregularly shaped shoulder (76) of said terminal member (36) being formed as a recess (82) in said second side (42) thereof, said recess (82) having a depth equal to the thickness of said flange (78) on said bushing (44).

18. An assembly as set forth in claim 17 further characterized by said terminal member (36) including a raised portion (90) disposed circumferentially about said hole (38) thereof on said first side (40) of said terminal member (36), said raised portion (90) having a height equal to said depth of said recess (82).

19. An assembly as set forth in claim 18 further characterized by said annular rib (54) of said bushing (44) being spaced axially from said outer annular ridge (84) toward said distal end (46) of said bushing (44).

20. An assembly as set forth in claim 19 further characterized by said bushing (44) including an outer annular ring (74) disposed about said distal end (46) thereof.

21. An assembly as set forth in claim 20 further characterized by said terminal member (36) and said bushing (44) being fabricated of an organic polymeric material.

* * * * *